(12) United States Patent
Meszaros et al.

(10) Patent No.: US 9,150,159 B1
(45) Date of Patent: Oct. 6, 2015

(54) VEHICLE ROOF RACK SYSTEM

(71) Applicant: Ford Global Technologies, LLC, Dearborn, MI (US)

(72) Inventors: Edward J. L. Meszaros, Amherstburg (CA); David Thomas Patrick, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 16 days.

(21) Appl. No.: 14/258,738

(22) Filed: Apr. 22, 2014

(51) Int. Cl.
    B60R 9/045      (2006.01)

(52) U.S. Cl.
    CPC .................................. B60R 9/045 (2013.01)

(58) Field of Classification Search
    CPC ............................... B60R 9/045; B60R 9/04
    USPC .................. 224/321, 319, 320, 325
    See application file for complete search history.

(56) References Cited

U.S. PATENT DOCUMENTS

| | | | | |
|---|---|---|---|---|
| 4,239,138 | A * | 12/1980 | Kowalski | 224/321 |
| 5,096,106 | A * | 3/1992 | Foster et al. | 224/321 |
| 5,273,195 | A * | 12/1993 | Cucheran | 224/316 |
| 5,282,562 | A | 2/1994 | Legault | |
| 5,511,708 | A * | 4/1996 | Cronce et al. | 224/321 |
| 6,029,873 | A * | 2/2000 | Won et al. | 224/321 |
| 2003/0173385 | A1* | 9/2003 | Aftanas et al. | 224/321 |
| 2004/0173651 | A1* | 9/2004 | Kim et al. | 224/310 |
| 2004/0195866 | A1* | 10/2004 | Fin | 296/210 |
| 2006/0060621 | A1* | 3/2006 | Klinkman et al. | 224/321 |
| 2006/0163297 | A1* | 7/2006 | Moreau | 224/321 |
| 2007/0039985 | A1* | 2/2007 | Warren et al. | 224/321 |
| 2007/0075108 | A1* | 4/2007 | Stapleton | 224/321 |
| 2008/0290123 | A1* | 11/2008 | Sprague | 224/321 |
| 2010/0327032 | A1* | 12/2010 | Aftanas | 224/315 |
| 2011/0240696 | A1* | 10/2011 | Polewarczyk et al. | 224/321 |
| 2012/0074187 | A1 | 3/2012 | Gobart | |
| 2012/0125961 | A1 | 5/2012 | Gobart | |

FOREIGN PATENT DOCUMENTS

DE      4018009 A1      12/1991

OTHER PUBLICATIONS

Stowaway Roof Rack (PT278-35050), Oct. 23, 2013, trdparts4u. toyotaofdallas.com/scripts/prodView.asp?idproduct=32669, 2 pages.

* cited by examiner

*Primary Examiner* — Brian D Nash
*Assistant Examiner* — Corey Skurdal
(74) *Attorney, Agent, or Firm* — Jason C. Rogers; Bejin Bieneman PLC

(57) ABSTRACT

A vehicle roof rack system for use on a roof of a vehicle which may include a moonroof the roof rack system includes first and second side rail members adapted to be mounted to the roof of the vehicle, the first and second side rail members each including a first channel located proximal a bottom side, a second channel located proximal a top side, a third channel extending substantially perpendicularly between the first and second channels, and a fourth channel extending substantially angularly between the first and second channels and a plurality of crossbows extending between the side rails and movable between a use position and a storage position at a plurality of locations along the side rails and also movable to channels in the rails located proximal the rear of the vehicle for storage of the rails and to provide an unobstructed view out the moonroof.

19 Claims, 7 Drawing Sheets

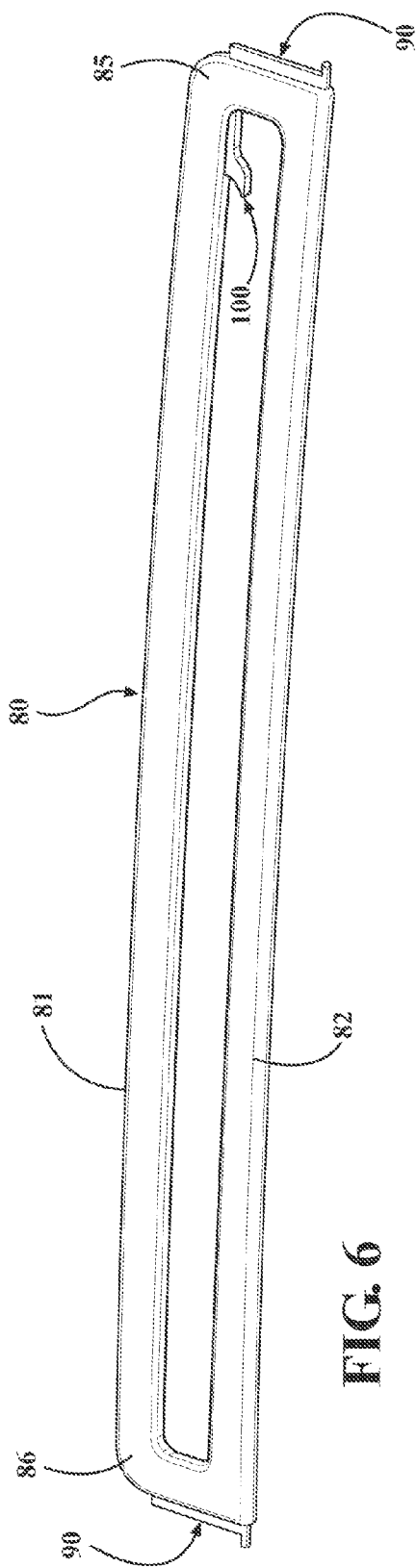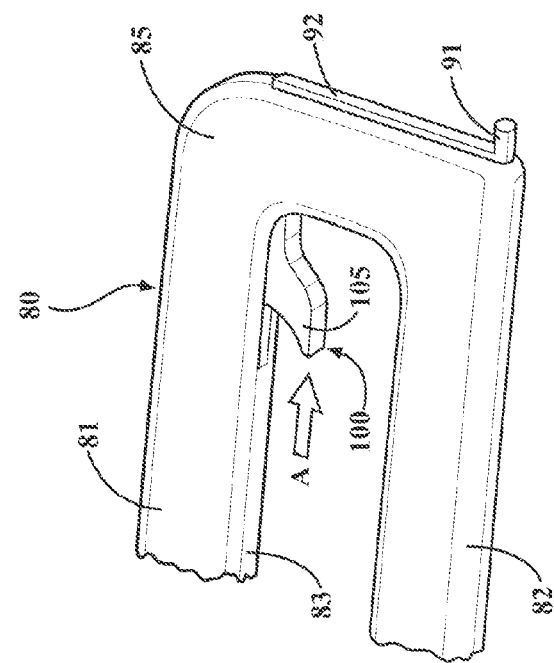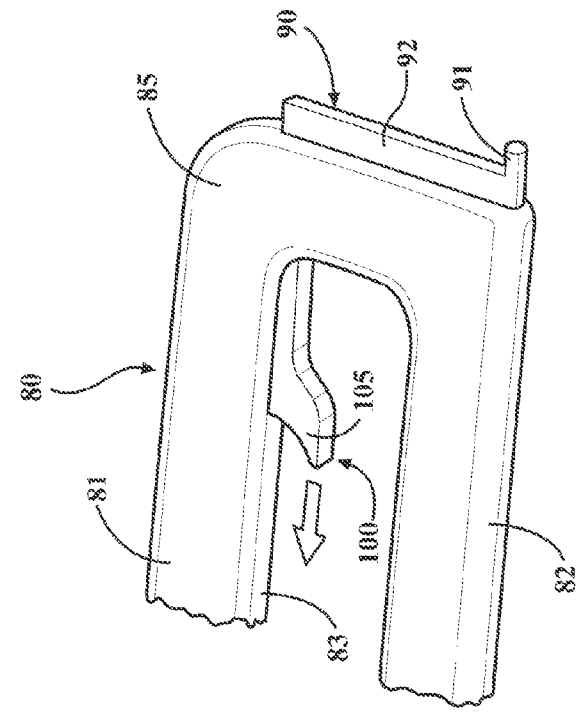
FIG. 6
FIG. 7
FIG. 8

VEHICLE ROOF RACK SYSTEM

BACKGROUND

The present disclosure generally relates to vehicles and, more particularly, relates to a vehicle having a roof rack system capable of improving usability of the roof area.

Sport utility and crossover type vehicles, may have issues integrating functional and useful roof rack systems on the roof of the vehicle due to a variety of vehicle features, improvements and changes. Generally, it is known to provide a vehicle having a roof rack system including height-adjustable cross members. However, such systems lack utility and function for particular vehicles and, in particular, for certain sport and utility vehicles having a panoramic moonroof wherein at least a portion of the roof rack system blocks or impedes the use of the panoramic moonroof view and/or it lacks customization to provide a variety or roof rack configurations. Existing original equipment manufacturer roof rack or cargo carrier systems lack a quick methodology for the deployment, manipulation, and setting of the crossbows on the roof rack system. There long remains a significant need for an improved original equipment roof rack system that may be easier and better used with more modern vehicle architectures and systems including a panoramic moonroof.

BRIEF DESCRIPTION OF THE DRAWINGS

FIG. 5A is a partial, perspective view of the detail of a side rail of the deployable, roof rack system.

FIG. 6 is a perspective, graphic view of the deployable, cross rail of the roof rack system according to the exemplary embodiment of FIG. 1.

FIG. 7 is a partial, perspective, graphic view of an end of the deployable, cross rail of the roof rack system in a first or latch position, according to the exemplary embodiment of FIG. 6.

FIG. 8 is a partial, perspective, graphic view of an end of the deployable, cross rail of the roof rack system in a second or unlatched position, according to the exemplary embodiment of FIG. 6.

DETAILED DESCRIPTION

Figure 1:
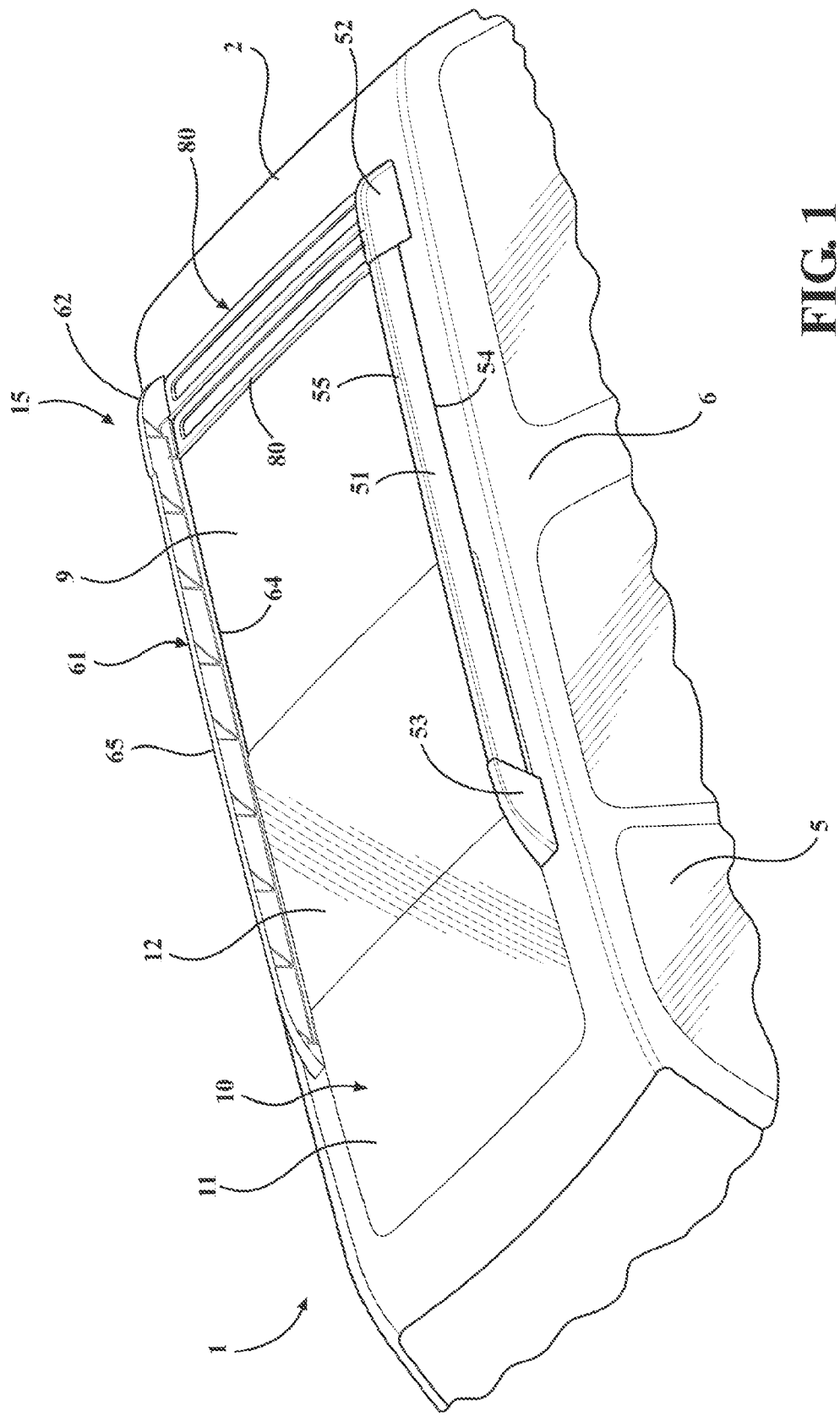
FIG. 1 is a perspective, graphic view of a portion of a vehicle including a deployable, roof rack system shown in a first or stowed position according to an exemplary embodiment of the present disclosure.

Referring in general to all of the Figures and in particular to FIGS. 1 through 4 there is disclosed exemplary embodiment (s) of a roof rack system 20 installed on a roof or top 9 of a vehicle 1 according to an exemplary embodiment of the present disclosure. The vehicle 1 shown in the present disclosure is a sport utility type vehicle but it should be understood that it is contemplated that the present disclosure may apply to any type of vehicle such as sedan, coupe, crossover, or the like. The vehicle 1 may include a rear end 2 and a cab or occupant or passenger compartment 5 that may be generally located between sides 6 of the vehicle 1 as generally known. The roof or top 9 generally extends over the cab or occupant portion 5 of the vehicle 1. The roof 9 of the vehicle 1 may further include a panoramic sunroof, moonroof or window 10 including a first or front portion 11 and a second or back portion 12.

A cargo or roof rack storage system 15. The roof rack or cargo storage rack system 15 may be factory installed as original equipment or it may alternatively be an aftermarket installed product. In one particular exemplary embodiment of the present disclosure, the roof rack storage system 15 may preferably include a first side rail member 51 adapted to be mounted to the roof 9 of the vehicle 1 proximal the left-hand side 6. The first side rail member 51 may preferably have a longitudinal extent between a first end 52 and a second end 53. As may be best noted in FIGS. 1 and 2, the second end 53 of the first side rail member 51 may preferably be located proximal the panoramic moonroof 10 located in the roof 9 of the vehicle 1. More particularly, in the exemplary embodiment of the present disclosure, the second end 53 of the first side rail 51 may be located proximal the midline of the first portion 11 and the second portion 12 of the panoramic moonroof 10. The first side rail member 51 may further include a bottom side 54 and a top side 55 defining a vertical height of the first side rail member 51. The roof rack storage system 15 may further preferably include a second side rail member 61 adapted to be mounted to the roof 9 of the vehicle 1 proximal the right-hand side 6. The second side rail member 61 may preferably have a longitudinal extent between a first end 62 and a second end 63. As best shown in FIGS. 1 through 4, the second side rail member 61 is located on the roof 9 proximal the panoramic moonroof 10 similar to the first side rail member 51. Similarly, the second side rail member 61 may further include a bottom side 64 and a top side 65 defining a vertical height. The first and second side rail members 51 and 61, respectively, each have a longitudinal axis or length defined by their respective first and second ends and which, when installed on the vehicle 1, may preferably be aligned parallel with the longitudinal length of the vehicle 1 and may be aligned parallel with the plane of the roof 9.

The roof rack storage system 15 of the exemplary embodiment of the present disclosure may further include a first cross bow 80 having a longitudinal length and having a first end 85 located proximal the first side rail member 51 and a second end 86 located proximal the second side rail member 61. In the exemplary embodiment of the present disclosure, the roof rack storage system 15 may further include a second cross bowed 80 also having a first end 85 and a second end 86 and extending substantially perpendicularly between the first side rail member 51 and the second side rail member 61. Each crossbow 80 may preferably be adjustably moved along the first and second side rail members 51 and 61, respectively, between a plurality of positions for achieving a variety of functions and objectives as further described below. Each crossbow 80 may preferably have a generally planar extent between its first end and its second end. In one exemplary embodiment according to the present disclosure, each crossbow 80 may preferably have an upper longitudinal member 81 and a lower longitudinal member 82 defining a passage or hole 83 there between extending substantially between the first end 85 and the second end 86. Each crossbow 80 may be made from any known or appropriate material using any known or appropriate manufacturing process or technique. In one particular exemplary embodiment according to the present disclosure, the crossbow 80 may preferably be made from a thermoplastic material and an injection molding process. The crossbow 80 may be made such that the upper member 81 and the lower member 82 may include a hollow interspace for other components. From a reinforced thermoplastic material.

Each crossbow 80 may preferably further include a first latch member or side locking mechanism 90 extendable from the end 85 and a second latch member or side locking mechanism 90 extendable from the end 86 as best shown in FIGS. 6 through 8. The first and second latch members 90 are selectively extendable from the first and second ends 85 and 86, respectively, for selectively engaging or coupling the crossbow 80 with the first and second side rail members 51 and 61, respectively. Each latch member 90 may preferably include a first portion 91 for engaging the side rail member and a second portion 92 for engaging a nether portion of the side rail member. As best shown in FIGS. 7 and 8, the first portion 91 of the latch member 90 extends from an end, such as end 85 of the crossbow 80, a greater length than the second portion 92 of the latch member 90. Further, the first portion 91 has a generally round cross-section and forms a pivot point for the crossbow 8. The second portion 92 of the latch 90 may preferably have a generally linear or planar shape as best shown in FIG. 7 and generally extends along the height of the end 85 of the crossbow 80 from the first portion 91 of the latch 90.

Figure 5:
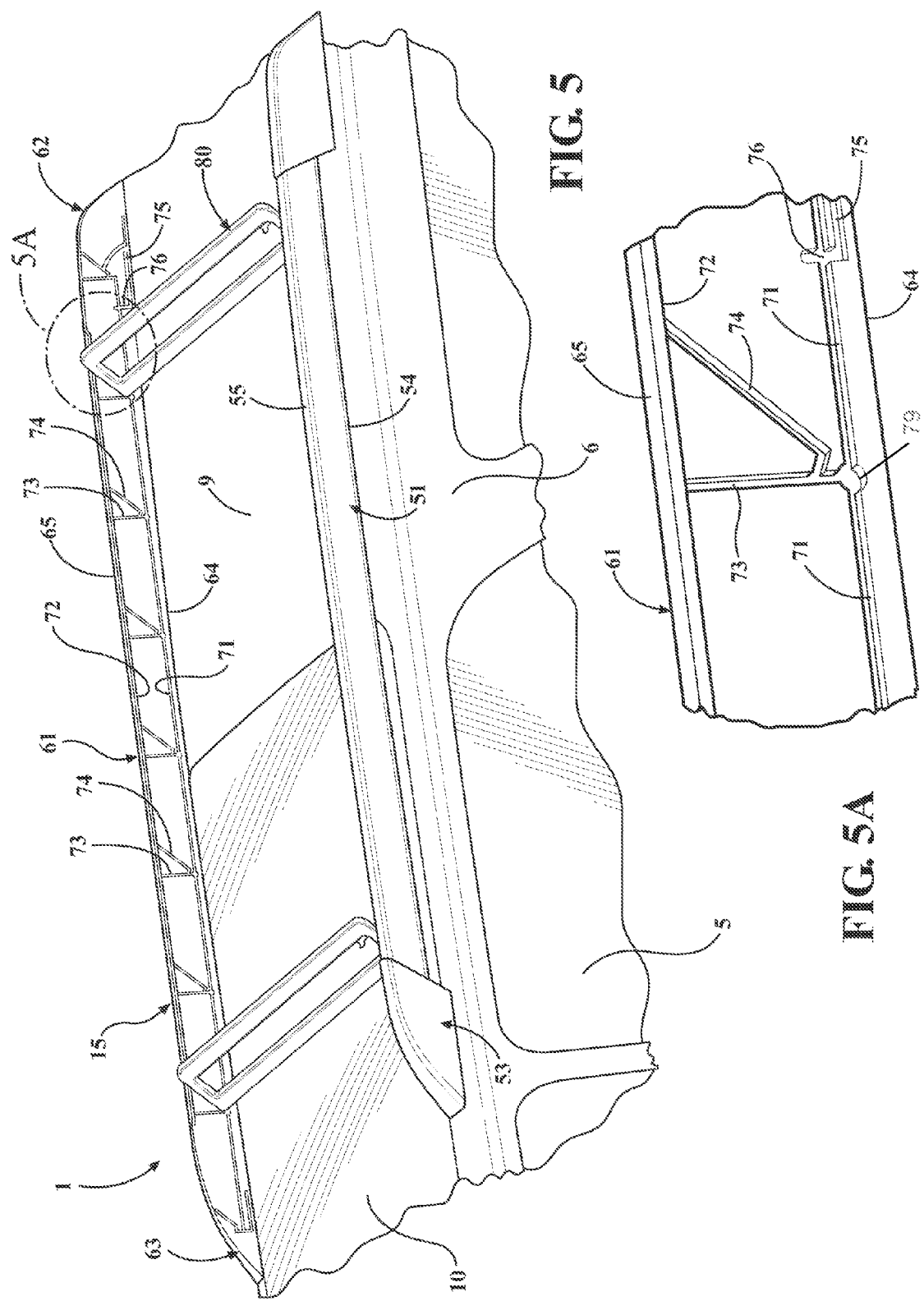
FIG. 5 is an alternate perspective, graphic view of the deployable, roof rack system on a vehicle wherein the deployable, roof rack system shown in the fourth or alternate use position according to the exemplary embodiment of FIG. 4.

Referring now in particular to FIGS. 7 and 8, there is disclosed and actuator 100 coupled to the crossbow 80 and located proximal the first end 85 of the crossbow 80. The actuator 100 extends into the passage 83 of the crossbow 80. The actuator 100 includes an engagement portion 105 for a user to push the actuator 100 in a direction represented by the arrow A in FIG. 8 for causing the latch members 90 at the first end 85 and the second end 86 to be retracted into the crossbow 80. It should be understood that the actuator 100 and/or latch member 90 may include a biasing member for biasing both latch members 90 of the crossbow 80 in a direction external of the crossbow 80 (i.e., biasing the latch members 90 toward the extended or latched position). The actuator 100 may be operable to move the latch members 90 against the biasing force of the biasing member as best shown in FIGS. 7 and 8. As a sufficient force is applied to the engagement portion 105 of the actuator 100, the actuator 100 is moved in a direction as represented by the arrow A in FIG. 8 against the biasing force of the internal biasing member. As the actuator 100 moves in the direction A, since it is coupled to both latch members 90, they are both retracted into a recess for receiving the latch members 90 located near the ends 85 and 86, respectively, of the crossbow 80. As best shown in FIG. 8, when the actuator 105 is actuated to move the latch members 90 to the retracted or unlatched position, the first portion 91 of the latch member 90 may extend from the end 85 of the crossbow 80 and the second portion 92 of the latch member 90 may be selectively disengaged from the first and second side rail members 51 and 61, respectively. The crossbow 80 may be selectively adjusted between various positions at a given location on the first and second side rail members 51 and 61, respectively, and may be moved to a variety of orientations and locations on the first and second side rail members 51 and 61, respectively, as best shown in FIGS. 1 through 5 and 9. Referring in particular to FIG. 5, it may be seen that a first crossbow 80 and a second crossbow 80 are arranged near the first and second ends of the first and second side rail members 51 and 61 of the roof rack system 15. Since each crossbow 80 may include an actuator 100 located proximal the first side rail member 51, a user may adjust and reposition the crossbows 80 from one side 6 (i.e., the left-hand side as shown in FIG. 5) of the vehicle 1. It is contemplated that the actuator 100 of the crossbow 80 may alternatively be located proximal the end 86 of the crossbow 80. It is further contemplated that an actuator 100 may be located at the first and second ends 85 and 86, respectively, of the crossbow 80 so that each crossbow 80 may be adjusted and/or repositioned from either side 6 of the vehicle 1.

Referring now in particular to FIGS. 5 and 5A, the detail of the interior side of the second side rail member 61 is shown detailing the variety of orientations and locations of the crossbow 80. It should be noted that the first and second side rail members 51 and 61, respectively, are designed and produced as substantially mirror images of each other such that explanation of the detail of the second side rail member 61 also provides explanation of the detail of the first side rail member 51. In one particular exemplary embodiment of the present disclosure, the second side rail member 61 includes or defines a first channel or passage 71 located proximal the bottom side 64. The first channel 71 extends substantially the entire length of the second side rail member 61 from the first end 62 to the second end 63. The first channel 71 is a substantially linearly extending passage and aligned substantially horizontal to the plane of the roof 9. The first channel 71 has a shape substantially complementing the profile or shape of the first portion 91 of the latch member 90, such that the first portion 91 may be securely located in and movable along the first channel 71. The second side rail member 61 may also include or define a second channel or passage 72 located proximal the top side 65. The second channel 72 may also extend substantially the entire length of the second side rail member 61 from the first end 62 to the second end 63 and may also be a substantially linearly extending passage aligned substantially horizontal to the first channel 71 and the plane of the roof 9.

Figure 2:
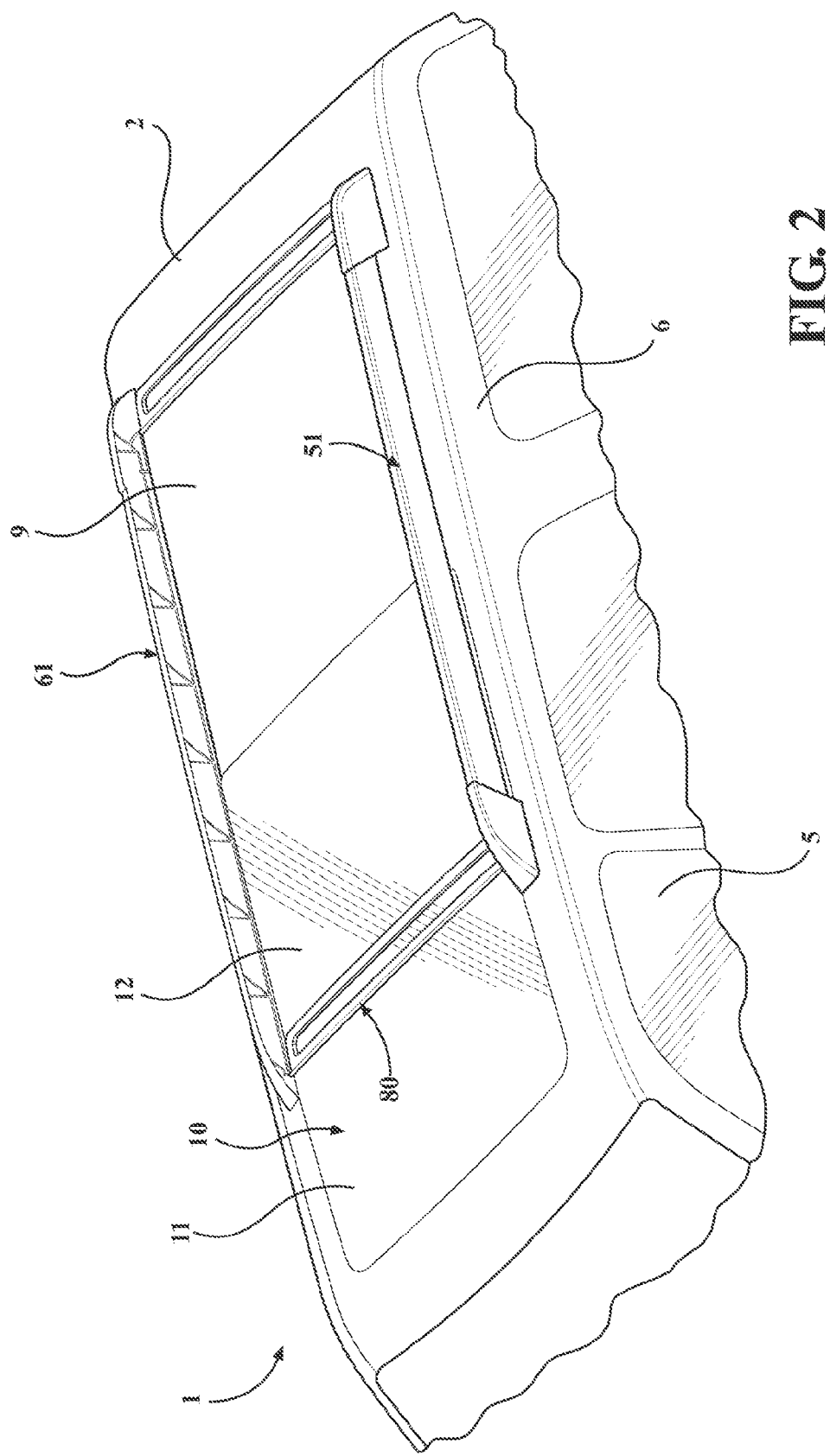
FIG. 2 is a perspective, graphic view of the deployable, roof rack system on a vehicle wherein the deployable, roof rack system is shown in a second or intermediate position according to the exemplary embodiment of FIG. 1.
Figure 3:
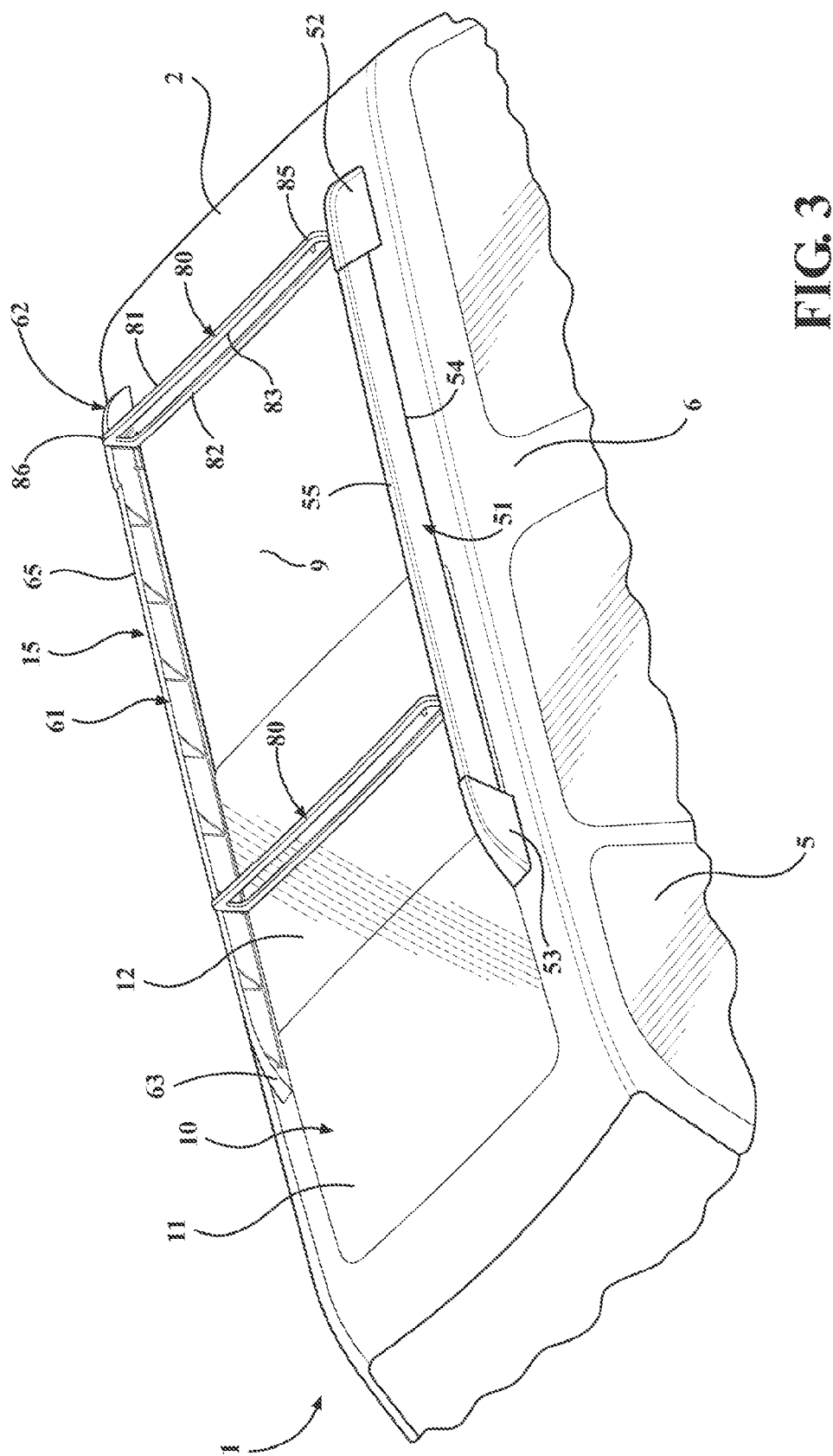
FIG. 3 is a perspective, graphic view of the deployable, roof rack system on a vehicle wherein the deployable, roof rack system is shown in a third or use position according to the exemplary embodiment of FIG. 1.
Figure 4:
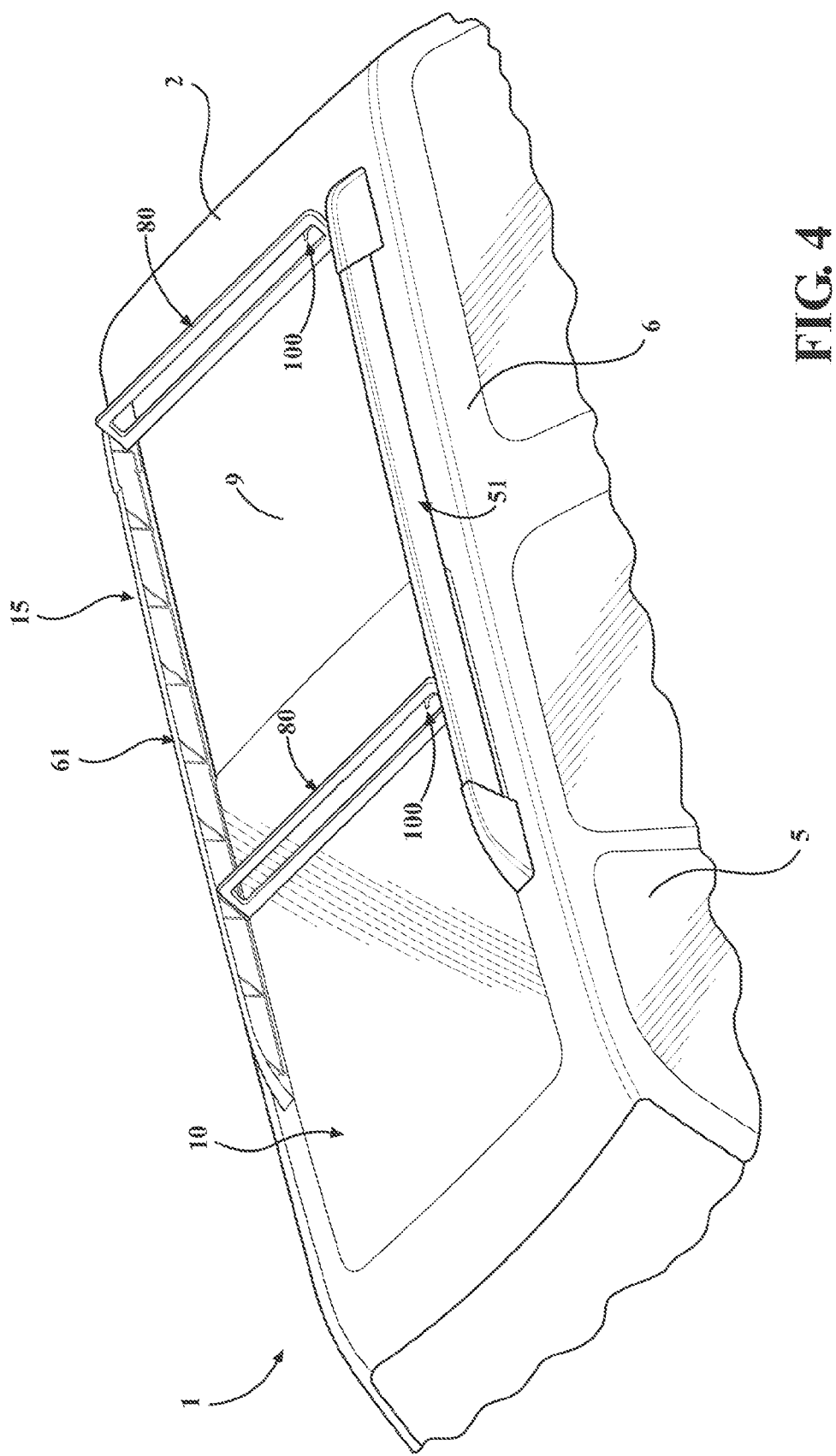
FIG. 4 is a perspective, graphic view of the deployable, roof rack system on a vehicle wherein the deployable, roof rack system is shown in a fourth or alternate use position according to the exemplary embodiment of FIG. 1.

The second side rail member 61 may also include a third channel 73 that may extend substantially perpendicularly between the first channel 71 and the second channel 72. The third channel 73 may preferably include a shape or cross-section design complementing the outer perimeter shape of the second portion 92 of the latch member 90. The second portion 92 of the latch member 90 may be located in the third channel 73 when the first and seconds ends 85 and 86, respectively, of the crossbow 80 are appropriately positioned proximal the third channels 73 of the first and second side rail members 51 and 61, respectively, and the first portion 91 of the latch member 90 may be located in the first channel 71 proximal the lower end of the third channel 73 when the actuator 100 is released as best shown in FIG. 3. When the actuator 100 is actuated and the second portion 92 of the latch member 90 is withdrawn from the third channel 73 and the first portion 91 of the latch member 90 remains in the first channel 71, the crossbow 80 may be angularly adjusted or pivoted on the first portion 91 and the crossbow 80 may be moved or translated along the first channel 71. The second portion 92 of the latch member 90 may also be received in the first channel 71 so that the crossbow 80 may be coupled in a horizontal position defining a first storage or use position in the first channel 71 as best shown in FIG. 2.

The second side rail member 61 may also include a fourth channel 74 extending substantially angularly between one of the first channel 71 and/or the third channel 73 at the one end and the second channel 72 at the other end. In one particular exemplary embodiment of present disclosure the end of the fourth channel 74 meets the second channel 72 proximal the first channel 71 and above a pivot point 79 as best shown in FIG. 5A. The fourth channel 74 may preferably be angularly offset from the roof plane at an angle of approximately between 25° and 70° and defines a second use position in which the plane of the crossbow 80 is aligned at an angle with respect to the plane of the roof 9 and is aligned with the third channel 75 of the first and second side rail members 51 and 61, respectively. More particularly, the fourth channel 74 may preferably be angularly offset from the roof plane at an angle of approximately between 45° and 60°. In one particular exemplary embodiment of the present disclosure, the fourth channel 74 may preferably be angularly offset from the roof plane at an angle of approximately 55°. Similar to the third channel 73, the fourth channel 74 may preferably include a shape or cross-section design complementing the outer perimeter shape of the second portion 92 of the latch member 90 so the second portion 92 may be located in and move along the fourth channel 74 when the end 86 of the crossbow 80 is appropriately positioned proximal fourth channel 74 and the actuator 100 is released and the second portion 92 is biased into the fourth channel 74 as best shown in FIG. 5 to lock the crossbow 80 in position. The crossbow 80 may preferably be movable to a third use position in which the plane of the crossbow 80 is substantially perpendicular with the plane of the roof 9 and the second portions of the first and second latch members 90 are located in the third channels 73 in the first and second side rails members 51 and 61, respectively.

Figure 9:
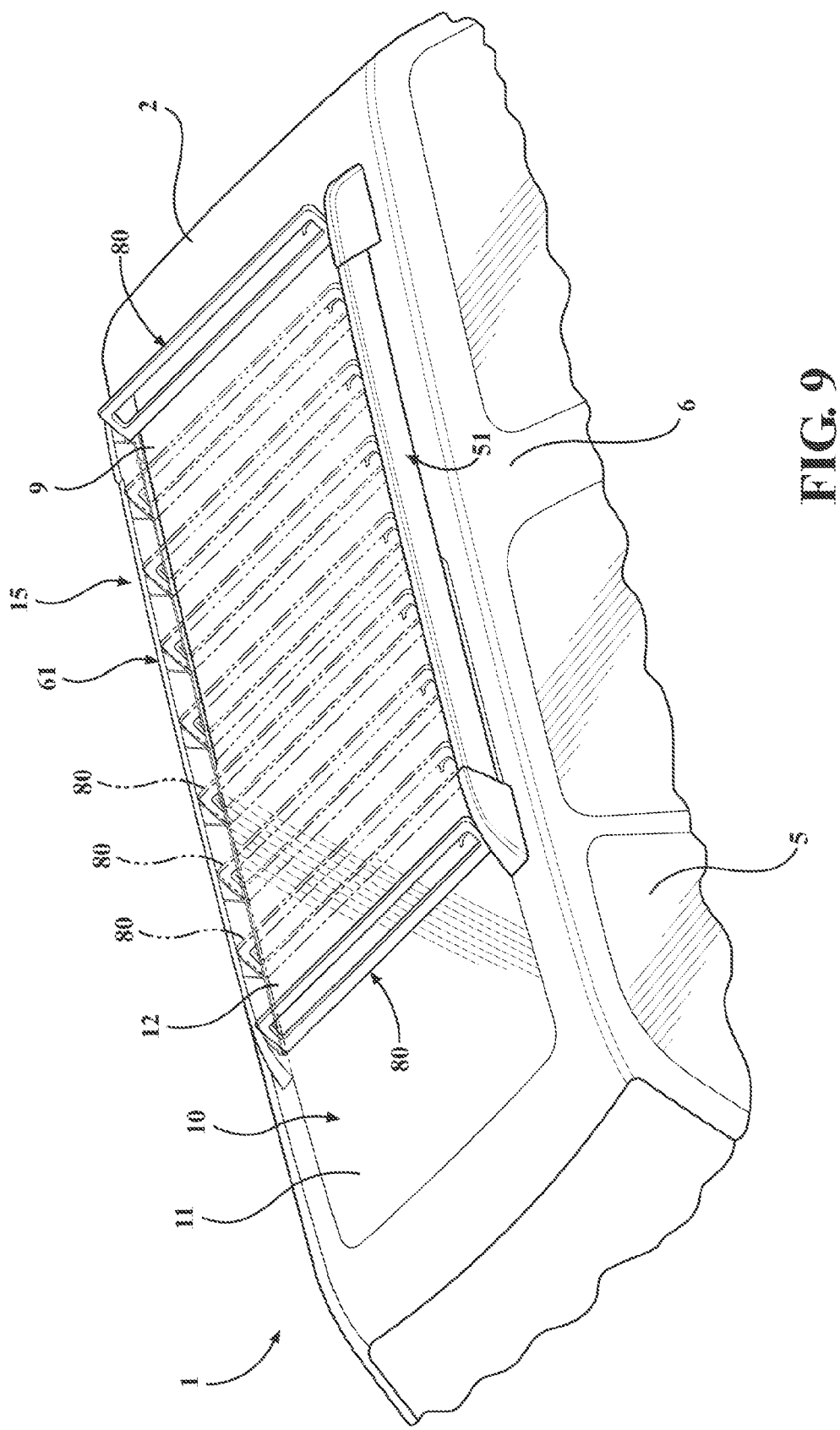
FIG. 9 is an alternate, perspective, graphic view of the deployable, roof rack system on a vehicle wherein the deployable, roof rack system is shown in a plurality of second and third positions according to the exemplary embodiment of FIG. 1.

In another exemplary embodiment of the present disclosure, the side rail 61 of the roof rack system 15 may further include or define a fifth channel 75 located proximal the first end 62 and having a linear extent aligned substantially horizontal with the first channel 71 and offset from the first channel 71 more proximal the bottom 64 of the second side rail member 61. A sixth channel 76 may extend substantially vertically and may interconnect the first channel 71 with the fifth channel 75 such that the first portion 91 of the latch member 90 may translate from the first channel 71 to the fifth channel 75 via the sixth channel 76. Accordingly, the shape or profile of the fifth channel 75 and the sixth channel 76 may be substantially similar or identical to that of the first channel 71. The crossbow 80 may be positioned in the fifth channel 75, as best shown in FIG. 1, at a position more proximal the roof 9 and away from the panoramic moonroof 10. The fifth channel 75 may preferably be sized so that the first and second crossbows 80 may be positioned away from the panoramic moonroof 10 (and proximal the rear 2 of the vehicle 1) so that an occupant located in the occupant compartment 5 of the vehicle 1 may have an unobstructed view out the panoramic moonroof 10. Further, the panoramic moonroof may be operated between a closed position and an open position without engaging any portion of the roof rack system 15. The roof rack system 15 may include first and second side rail members 51 and 61, respectively, that may include a plurality of third and fourth channels 73 and 74, respectively, so the crossbows 80 may be located at a variety of locations and orientations between the first ends 52 and 62 and the second ends 53 and 63, as best shown in FIG. 9. Accordingly, a user of the roof rack system 15 has great flexibility in configuring the crossbows 80 along the first and second side rail members 51 and 61, respectively, while still being able to fully and completely enjoy the benefits of the panoramic moonroof 10.

The description and figures are intended to be illustrative and not restrictive. Many alternate embodiments and many applications besides the exemplary embodiments provided will become apparent to those of ordinary skill in the relevant art upon understanding the present disclosure. The scope of the claimed invention should not be determined with limiting reference to the description and figures but should instead be determined with reference to the appended claims along with the full scope of equivalents to which such claims are entitled. Any reference or disclosure of an article or publication, including patents and patent applications, is intended to be an incorporation by reference herein for all purposes. Any omission in the claims of any aspect of subject matter disclosed in the description and figures is not intended to be a disclaimer of such subject matter.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless expressly stated, all ranges are intended to include both endpoints and all numbers between the endpoints. The use of "generally, "about" or "approximately", or similar words, in connection with a range applies to both ends of the range. Thus, "about 20 to 30" is intended to cover "about 20 to about 30", inclusive of at least the specified endpoints.

The disclosure of "a" or "one" to describe an element, ingredient, component or step is not intended to foreclose additional elements, ingredients, components or steps. Plural elements, ingredients, components or steps may be provided by a single integrated element, ingredient, component or step. Alternatively, a single integrated element, ingredient, component or step may include separate plural elements, ingredients, components or steps.

We claim:

1. A vehicle roof rack system for installation on a roof of a vehicle, the roof generally defining a plane, the roof rack system comprising:
a first side rail member adapted to be mounted to a roof of a vehicle, the first side rail member having a longitudinal length and having a first end and a second end, the first side rail member having a vertical height defined by a top side and a bottom side, a first channel located proximal the bottom side and a second channel located proximal the top side, a third channel extending substantially perpendicularly between the first and second channels, and a fourth channel extending substantially angularly between the first and second channels;
a second side rail member adapted to be mounted to a roof of a vehicle aligned with, and a spaced distance from, the first side rail member, the second side rail member having a longitudinal length and having a first end and a second end, the second side rail member having a vertical height defined by a top side and a bottom side, a first channel located proximal the bottom side and a second channel located proximal the top side, a third channel extending substantially perpendicularly between the first and second channels, and a fourth channel extending substantially angularly between the first and second channels;

a first crossbow having a longitudinal length and having a first end located proximal the first side rail member and a second end located proximal the second side rail member, the first crossbow having a generally planar boundary between the first and second ends;

a first latch member extendable from the first end of the first crossbow for selectively engaging the first end of the first crossbow with the first side rail member, the first latch member having a first portion for engaging the first channel in the first side rail member and a second portion for engaging the second channel in the first side rail member;

a second latch member extendable from the second end of the first crossbow for selectively engaging the second end of the first crossbow with the second side rail member, the second latch member having a first portion for engaging the first channel in the second side rail member and a second portion for engaging the second channel in the second side rail member; and wherein the first crossbow is movable between a first stowed position in which the plane of the first crossbow is substantially aligned with the longitudinal axis of the first channels and the roof plane and a second use position in which the plane of the first crossbow is aligned at an angle with respect to the roof plane and is aligned with the third channels of the first and second side rail members.

2. The vehicle roof rack system of claim 1 wherein the first crossbow is movable to a third use position in which the plane of the first crossbow is substantially perpendicular with the roof plane and the second portions of the first and second latch members are located in the third channels in the first and second side rails members.

3. The vehicle roof rack system of claim 1 wherein the first portions of the first and second latch members each has a generally round cross section and provides a movable pivot point for the first crossbow and wherein the second portions of the first and second latch members each has a generally linear portion for selectively engaging any of the first, third or fourth channels of the first and second side rail members.

4. The vehicle roof rack system of claim 1 further comprising a second crossbow having a longitudinal length and having a first end located proximal the first side rail member and a second end located proximal the second side rail member, the second crossbow having a generally planar boundary between the first and second ends and wherein the second crossbow is movable between a first stowed position in which the plane of the second crossbow is substantially aligned with the longitudinal axis of the first channels and the roof plane and a second use position in which the plane of the second crossbow is aligned at an angle with respect to the roof plane and is aligned with the third channels of the first and second side rail members and wherein the first and second crossbows may be moved proximal each other and proximal the second ends of the first and second side rail members to provide an unobstructed view through a panoramic window in the roof of the vehicle.

5. The vehicle roof rack system of claim 4 wherein the angle of the fourth channels in the first and second side rail members with respect to the roof plane is between approximately twenty five and seventy degrees.

6. The vehicle roof rack system of claim 5 wherein the angle of the fourth channels in the first and second side rail members with respect to the roof plane is between approximately forty five and sixty degrees.

7. The vehicle roof rack system of claim 5 wherein the first and second side rail members each include a fifth channel aligned substantially parallel to the roof plane and located more proximal the bottom sides of the first and second rails than the first channel and wherein each fifth channel is coupled to the first channel for receiving the first and second portions of the first and second latch members of the first and second crossbows in a location more proximal the bottom side of the first and second side rail members.

8. The vehicle roof rack system of claim 4 further comprising a first actuator coupled to the first crossbow and located proximal the first end of the first crossbow and wherein the first actuator is coupled to the first and second latch members for selectively engaging the first and second portions of the first and second latch members of the first crossbow with the first and second side rail members.

9. The vehicle roof rack system of claim 8 further comprising a second actuator coupled to the second crossbow and located proximal the first end of the second crossbow and wherein the second actuator is coupled to the first and second latch members for selectively engaging the first and second portions of the first and second latch members of the second crossbow with the first, second, third, and fourth channels in the first and second side rail members.

10. The vehicle roof rack system of claim 7 further comprising a second actuator coupled to the second crossbow and located proximal the first end of the second crossbow and wherein the second actuator is coupled to the first and second latch members for selectively engaging the first and second portions of the first and second latch members of the second crossbow with the first, second, third, fourth and fifth channels in the first and second side rail members.

11. A vehicle roof rack system for installation on a roof of a vehicle, the roof generally defining a plane, the roof rack system comprising:

a first side rail member adapted to be mounted to a roof of a vehicle, the first side rail member having a longitudinal length and having a first end and a second end, the first side rail member having a vertical height defined by a top side and a bottom side, a first channel located proximal the bottom side and a second channel located proximal the top side, a third channel extending substantially perpendicularly between the first and second channels, and a fourth channel extending substantially angularly between the first and second channels;

a second side rail member adapted to be mounted to a roof of a vehicle aligned with, and a spaced distance from, the first side rail member, the second side rail member having a longitudinal length and having a first end and a second end, the second side rail member having a vertical height defined by a top side and a bottom side, a first channel located proximal the bottom side and a second channel located proximal the top side, a third channel extending substantially perpendicularly between the first and second channels, and a fourth channel extending substantially angularly between the first and second channels;

a first crossbow having a longitudinal length and having a first end located proximal the first side rail member and a second end located proximal the second side rail member, the first crossbow having a generally planar boundary between the first and second ends and wherein the first crossbow is movable between a first stowed position in which the plane of the first crossbow is substantially aligned with the roof plane and a second use position in which the plane of the first crossbow is aligned at an angle with respect to the roof plane;

a first latch member extendable from the first end of the first crossbow for selectively engaging the first end of the first crossbow with the first side rail member, the first latch member having a first portion for engaging the first channel in the first side rail member and a second portion for engaging the second channel in the first side rail member;

a second latch member extendable from the second end of the first crossbow for selectively engaging the second end of the first crossbow with the second side rail member, the second latch member having a first portion for engaging the first channel in the second side rail member and a second portion for engaging the second channel in the second side rail member;

a second crossbow having a longitudinal length and having a first end located proximal the first side rail member and a second end located proximal the second side rail member, the second crossbow having a generally planar boundary between the first and second ends and wherein the second crossbow is movable between a first stowed position in which the plane of the second crossbow is substantially aligned with the roof plane and a second use position in which the plane of the second crossbow is aligned at an angle with respect to the roof plane;

a third latch member extendable from the first end of the second crossbow for selectively engaging the first end of the second crossbow with the first side rail member, the third latch member having a first portion for engaging the first channel in the first side rail member and a second portion for engaging the second channel in the first side rail member;

a fourth latch member extendable from the second end of the first crossbow for selectively engaging the second end of the first crossbow with the second side rail member, the second latch member having a first portion for engaging the first channel in the second side rail member and a second portion for engaging the second channel in the second side rail member; and wherein the first and second crossbows may be moved proximal each other and may be moved proximal the second ends of the first and second side rail members.

12. The vehicle roof rack system of claim 11 wherein the first and second crossbows are movable to a third use position in which the planes of the first and second crossbows are substantially perpendicular with the roof plane and the second portions of the first, second, third and fourth latch members are located in the third channels in the first and second side rail members.

13. The vehicle roof rack system of claim 12 wherein the first and second crossbows are spaced a predetermined distance apart.

14. The vehicle roof rack system of claim 13 wherein the first and second crossbows each define a plurality of third and fourth channel combinations spaced along the first and second side rail members for selectively locating the first and second crossbows between the first and second ends.

15. The vehicle roof rack system of claim 11 further comprising:

a first actuator coupled to the first crossbow and located proximal the first end of the first crossbow and wherein the first actuator is coupled to the first and second latch members of the first crossbow for selectively engaging the first and second portions of the first and second latch members of the first crossbow with the first and second side rail members; and a second actuator coupled to the second crossbow and located proximal the first end of the second crossbow and wherein the second actuator is coupled to the first and second latch members of the second crossbow for selectively engaging the first and second portions of the first and second latch members of the second crossbow with the first and second side rail members.

16. A vehicle having an occupant compartment located between sides of the vehicle, the vehicle comprising:

a roof covering at least a portion of the occupant compartment;

a panoramic moonroof located in the roof and proximal the occupant compartment;

a roof rack system comprising:

a first side rail member mounted to the roof proximal a side of the vehicle, the first side rail member having a longitudinal length aligned parallel with the longitudinal axis of the vehicle, the first side rail member having a first end and a second end, the first side rail member having a vertical height defined by a top side and a bottom side, the first side rail member defining a first channel located proximal the bottom side and a second channel located proximal the top side, a third channel extending substantially perpendicularly between the first and second channels, and a fourth channel extending substantially angularly offset from the first and third channels and extending between the first and second channels;

a second side rail member mounted to the roof proximal the other side of the vehicle, the second side rail member having a longitudinal length aligned with, and a spaced distance from, the first side rail member, the second side rail member having a first end and a second end, the second side rail member having a vertical height defined by a top side and a bottom side, the first side rail second side rail member defining a first channel located proximal the bottom side and a second channel located proximal the top side, a third channel extending substantially perpendicularly between the first and second channels, and a fourth channel extending substantially angularly offset from the first and third channels and extending between the first and second channels;

a first crossbow having a longitudinal length and having a first end located proximal the first side rail member and a second end located proximal the second side rail member, the first crossbow having a generally planar boundary between the first and second ends;

a first latch member extendable from the first end of the first crossbow for selectively engaging the first end of the first crossbow with the first side rail member, the first latch member having a first portion for engaging the first channel in the first side rail member and a second portion for engaging the second channel in the first side rail member;

a second latch member extendable from the second end of the first crossbow for selectively engaging the second end of the first crossbow with the second side rail member, the second latch member having a first portion for engaging the first channel in the second side rail member and a second portion for engaging the second channel in the second side rail member;

wherein the first crossbow is movable between a first stowed position in which the plane of the first crossbow is substantially aligned with the longitudinal axis of the first channels and the roof plane and a second use position in which the plane of the first crossbow is aligned at an angle with respect to the roof plane and is aligned with the third channels of the first and second side rail members; and wherein the first and second crossbows may be moved proximal each other and may be moved proximal the second ends of the first and second side rail members such that the first and second crossbows may not be observed through the panoramic moonroof from within the occupant compartment of the vehicle.

17. The vehicle claim 16 wherein the first and second crossbows of the roof rack system are movable to a third use position in which the planes of the first and second crossbows are substantially perpendicular with the roof plane and the second portions of the first, second, third and fourth latch members are located in the third channels in the first and second side rail members.

18. The vehicle claim 17 wherein the first and second crossbows of the roof rack system of spaced a predetermined distance apart.

19. The vehicle of claim 18 wherein the first and second crossbows of the roof rack system each define a plurality of third and fourth channel combinations spaced along the first and second side rail members for selectively locating the first and second crossbows between the first and second ends.

\* \* \* \* \*